United States Patent
Tazawa et al.

[19]

[11] Patent Number: 6,049,375
[45] Date of Patent: Apr. 11, 2000

[54] PICTURE IMAGE INPUT APPARATUS

[75] Inventors: Masashi Tazawa, Kawasaki; Takahiro Ikeda, Tokyo; Eisaku Maeda, Sakura; Maki Suzuki, Ichikawa, all of Japan

[73] Assignee: Nikon Corporation, Tokyo, Japan

[21] Appl. No.: 08/845,201

[22] Filed: Apr. 21, 1997

[30]    Foreign Application Priority Data

| Apr. 19, 1996 | [JP] | Japan | 8-098433 |
| Apr. 19, 1996 | [JP] | Japan | 8-098473 |
| Apr. 19, 1996 | [JP] | Japan | 8-098516 |
| Apr. 14, 1997 | [JP] | Japan | 9-095703 |

[51] Int. Cl.$^7$ ............ G03B 27/62; H04N 1/00; H04N 5/253
[52] U.S. Cl. ............ 355/75; 355/18; 358/474; 358/487; 358/506; 348/96
[58] Field of Search ............ 355/75, 18; 358/506, 358/487, 496, 498, 474; 348/96, 97; 396/429, 512, 538; 352/72, 78; 353/26 R

[56]    References Cited

U.S. PATENT DOCUMENTS

| 3,675,992 | 7/1972 | Winkler et al. | 352/78 |
| 5,309,242 | 5/1994 | Asami et al. | 348/97 |
| 5,623,303 | 4/1997 | Inoue et al. | 348/96 |
| 5,754,314 | 5/1998 | Araki et al. | 358/487 |
| 5,812,896 | 9/1998 | Okuno et al. | 396/538 |

FOREIGN PATENT DOCUMENTS 7-240874   9/1995   Japan .

*Primary Examiner*—Alan A. Mathews
*Attorney, Agent, or Firm*—Oliff & Berridge, PLC

[57]    ABSTRACT

A film scanner device is provided with a support device that can load and hold a cartridge having a cartridge shaft. The cartridge houses a transmissive original medium that is stored around the cartridge shaft. In a device housing, a detector detects the presence or absence of the cartridge and whether or not the transmissive original medium in the cartridge has been developed. The detector has a minimal number of components to reduce the device costs. The detector can be a single electrical switch that detects at least three states of the support device holding the cartridge. A cover opens to expose and closes to cover a loading unit on the support device. The cover is provided on one portion of the outer surface of the device housing. The cover slides between an open position and a closed position by moving in a surface direction of the outer surface. Accordingly, the cover does not protrude outside the outer surface. Thus, the device provides an efficiency of space for arranging external apparatuses around the device housing while smoothly loading the film cartridge. In addition, a pressing member in the support device moves into the loading unit with the closing motion of the cover to support the cartridge shaft in the closed position of the cover. A film feeding shaft engages the cartridge shaft with the closing motion of the cover. Further, a guard unit is provided that protects the film feeding shaft during loading of the cartridge. The feeding shaft is provided in a notch that is accessed through an opening in the guard unit. The film feeding shaft can be inserted or withdrawn through the opening.

31 Claims, 13 Drawing Sheets

Figure 2

PICTURE IMAGE INPUT APPARATUS

BACKGROUND OF THE INVENTION

1. Field of the Invention

The present invention relates to a picture image input apparatus that uses transillumination to read the picture images photographed on each frame of film, and more particularly to a picture image input apparatus loading mechanism specifically for film cartridges housing developed film.

2. Description of Related Art

A conventional film scanner, which is also known as a picture image input apparatus, reads the picture images on film that has been photographed by a camera using image sensors such as CCDs or the like. The conventional film scanner reads the images of negative film and reversal film and can input the image data to a personal computer or the like.

In addition, in Laid-Open Japanese Patent Publication 7-240874, a picture image input apparatus reads the images photographed on the film one at a time and re-displays these on a video monitor. In particular, this conventional picture image input apparatus uses the new standard film known as the Advanced Photo System where the developed film is stored by being wound lengthwise in the cartridge. The picture images of the developed film wound and stored in the cartridge are read by loading the film cartridge into a loading unit. However, in Laid-Open Japanese Patent Publication 7-240874 there is no disclosure of any mechanical apparatus structure necessary to the picture image input apparatus. Further, there are several problems that must be resolved.

For example, these problems include loading of the film cartridge into the cartridge loading unit, the structure used for film cartridge extraction, position determination and support in the picture image input apparatus, the structure of a cover unit that opens and closes the loading unit, the protective structure of the developed film and the film cartridge, and so forth.

Photo film under the new standard known as the Advanced Photo System is called IX 240 type film. The IX 240 type of film is provided with a picture image memory area and a magnetic memory area used to store various types of photography information. The magnetic memory area is a 24 mm wide silver halide film surface on a side of the film. The IX 240 type of film has a film cartridge with a light-shielding cover. When the film is loaded into a camera, the IX 240 type of film is successively scrolled out from the film cartridge, which is in an open state when the light-shielding cover is open. After photography has been completed, the IX 240 film is completely wound into the film cartridge and the light-shielding cover of the film cartridge is closed. Then, the film cartridge is extracted from the camera or the like. In addition, the film which has been developed is again rewound into the film cartridge where it is stored.

Consequently, the above-described picture image input apparatus or a printing machine, for example, reads the picture image data on the IX 240 film by loading the developed film rewound in the film cartridge into the picture image input apparatus or the printing machine.

As noted above, there are still problems to resolve with picture image input apparatus using the IX 240 type of film and film cartridge. In particular, a simpler structure and more compact system having lower production costs is needed for the conventional picture image input apparatus using the IX 240 film.

Further, in conventional picture image input apparatus, a cover member that opens and closes a loading unit that loads the film cartridge has a structure that is drawn out away from the front of the apparatus housing. During loading and removal of a film cartridge, the cover member protrudes from the housing. Consequently, it is necessary to have additional space to the extent of the protrusion of the cover member around the installed picture image input device.

SUMMARY OF THE INVENTION

It is an objective of the present invention to provide a picture image input apparatus that solves at least the above-described problems.

It is another object of the present invention to improve the space efficiency of the picture image input apparatus housing while loading and extracting the film cartridge. The improved space efficiency allows effective use of additional devices adjacent to the picture image input apparatus housing.

It is yet another object of the present invention to provide a detection device that discriminates cartridge film development status and detects the absence or presence of cartridge in the picture image input apparatus.

It is still yet another object to provide a guard device to protect the driving shaft while loading and extracting the film cartridge.

In order to meet the objects, the picture image input device according to the present invention includes a support device that supports a cartridge housing a transmissive original document wound around an original document support shaft, a feeding device that feeds the transmissive original document scrolled out from the cartridge, an illumination device that illuminates the transmissive original document with light during feeding by the feeding device, a reading device that reads by forming an image from the transmitted light transilluminating the transmissive original document and a cover that opens to expose the support device.

Further, the picture image input device can include a detection device that discriminates cartridge film development status and detects the absence or presence of cartridge loaded in the support device. The detection device can be, for example, a single electrical switch provided on the support device having at least three states. Thus, superior results can be achieved with a simple structure. Further, it is possible to reduce the number of components, and to keep production costs low.

The cover can further include a slide-type structure to open and close the picture image input device. The cover can attach to an external surface of the apparatus housing. Further, the cover reciprocates along a surface direction of the external surface to open and close a loading unit of the support device. Thus, the cover does not protrude farther to the outside than the outer surface of the apparatus housing. Accordingly, reserving space around the picture image input device housing, in particular space near the cover is unnecessary. Hence, it is possible to increase the degree of freedom in arranging the device with other apparatuses. In addition, loading and removing the cartridge from the device can be easily accomplished.

In addition, the loading unit of the support device of the picture image input apparatus can further include a driving shaft that supports the cartridge and a inner cover guide unit that guides the cartridge in the direction of the driving shaft in conjunction with a closing movement of the cover. Further, a detection edge on the guide unit that is provided with relative movement with respect to the closed loading unit can be detected by the detection device. Further, the detection edge moves with the cover. Thus, the detection edge does not become an obstacle when loading the cartridge into the loading unit. Accordingly, loading of the cartridge can be easily accomplished.

Further, stable support is possible when the cartridge is loaded and the inner cover guide unit is closed. The inner cover guide unit guides the cartridge while covering the loading unit in conjunction with the movements of the cover.

The picture image input device can further include a pressing member that moves in conjunction with the movement of the cover. The pressing member presses the original document support shaft of the film cartridge with the closing movement of the cover. The pressing member withdraws when the cover opens. The pressing member is energized by a spring.

The picture image input device can also include a driving shaft that engages the original document support shaft to support the original document support shaft and feed the film, and a guard unit that protects the driving shaft during loading of the cartridge. The driving shaft is positioned in a notch provided on one side of the cartridge loading unit and protected by the guard unit. The guard unit includes an opening through which the original document support shaft or the driving shaft can be inserted or withdrawn. Beneficially, notwithstanding the simple structure, the cartridge can be easily loaded into the loading unit, while the driving shaft is protected and then reliably engaged. Thus, it is possible to prevent damage to the driving shaft by preventing impact between the cartridge and the driving shaft during loading of the cartridge. Further, using the driving shaft, the driving source for film feeding and the reduction gear string can be simplified. Moreover, it is possible to anchor the film cartridge with certainty with this structure. The guide unit can be slidingly attached to the support device. In this case, preferably the guard unit and the driving shaft move as one unit relative to the support device while loading the film.

Further, the picture image input device can include an elastic member provided on the support device that temporarily anchors the cartridge in the loading unit. The elastic member and the loading unit operate to provide a "click" engagement when the film cartridge becomes mounted by temporarily anchored in the cartridge loading unit. The elastic member provides additional support to the loaded cartridge regardless of the posture of the picture image input apparatus. Further, the cartridge can be loaded regardless of the posture of the picture image input device. A cut is formed in the loading unit to permit easy access when removing the cartridge.

Other objects, advantages and salient features of the invention will become apparent from the detailed description taken in conjunction with the annexed drawings, which illustrate preferred embodiments of the invention.

BRIEF DESCRIPTION OF THE DRAWINGS

The invention will be described with reference to the following drawings in which like reference numerals refer to like elements and wherein:

Figure 2:
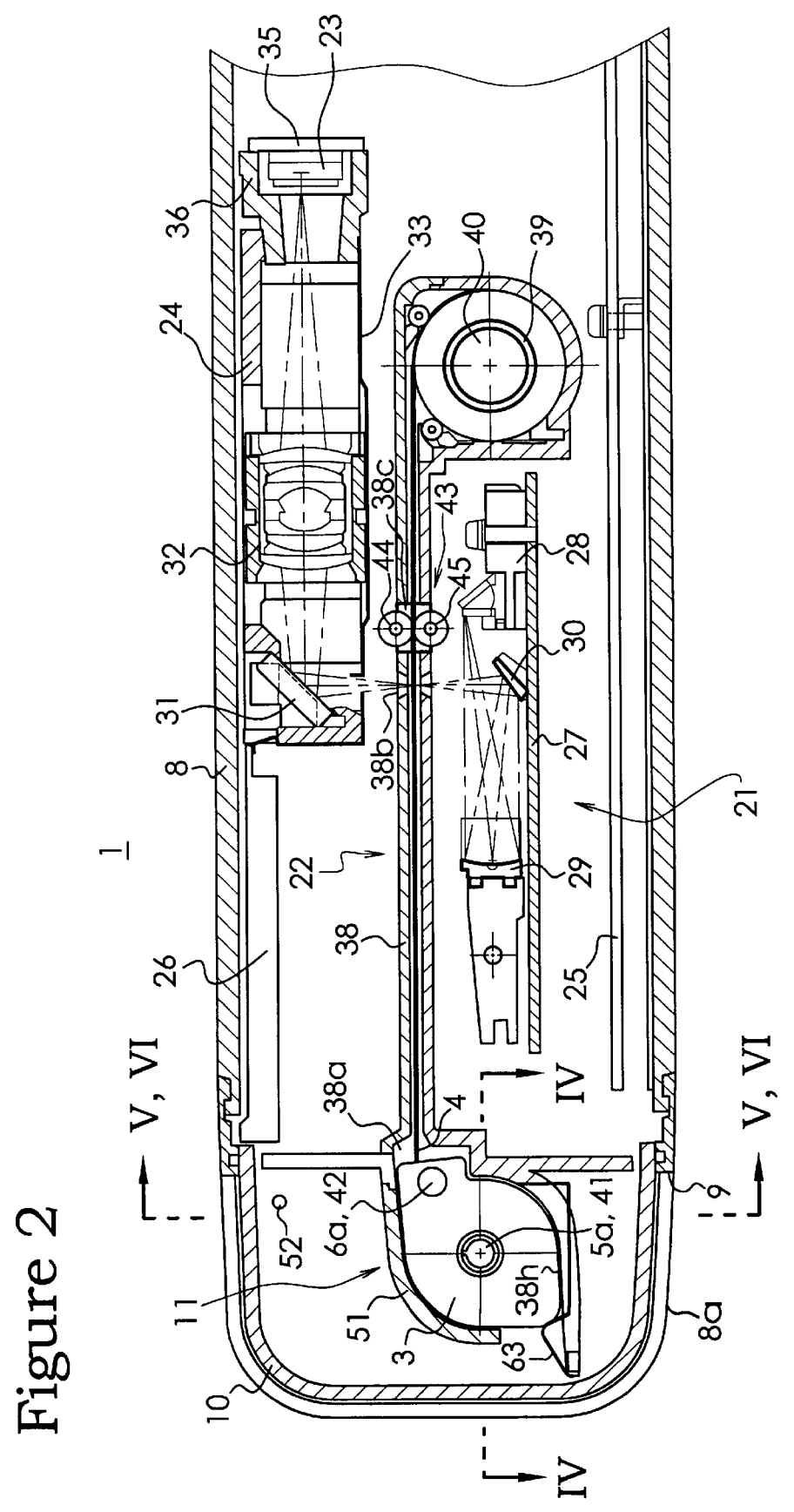

FIG. 2 is a cross-sectional view along line II—II of the picture image input apparatus of FIG. 1;

DETAILED DESCRIPTION OF PREFERRED EMBODIMENTS

Figure 1:
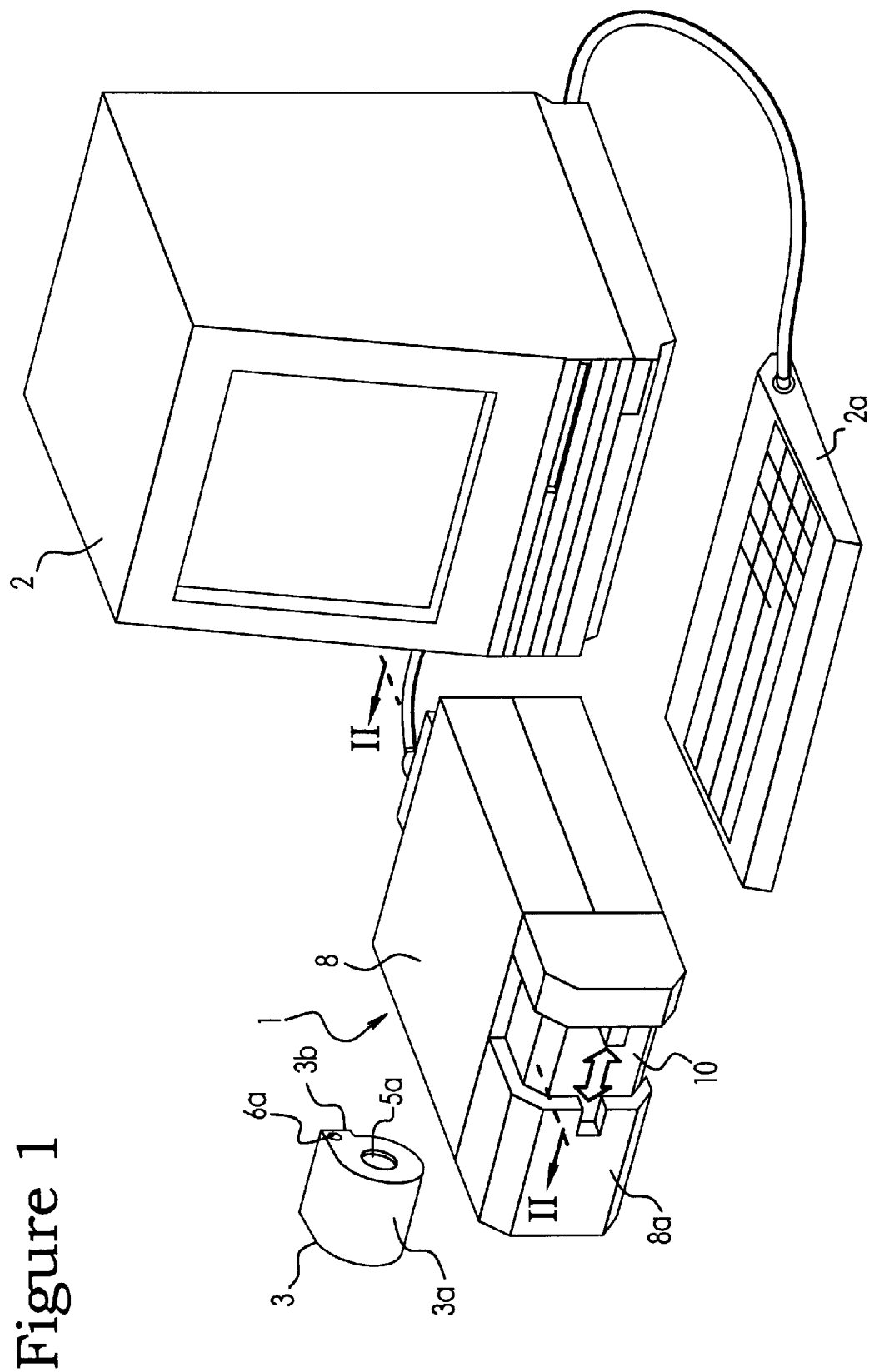
FIG. 1 is a diagram showing a perspective view of one embodiment of a picture image input apparatus according to the present invention connected to a computer.

A first preferred embodiment of a picture image input apparatus according to the present invention will be described with respect to FIGS. 1–12. A picture image input apparatus 1 is, for example, a film scanner that inputs picture images recorded on a film 4 as shown in FIG. 2. The apparatus 1 can connect to a personal (hereinafter host) computer 2 as shown in FIG. 1. The host computer 2 outputs commands to the picture image input apparatus 1. Based on the commands, the picture image input apparatus 1 performs various processes including reading picture images photographed on the film 4. A keyboard 2a is an operation input unit for the host computer 2.

Figure 9B:
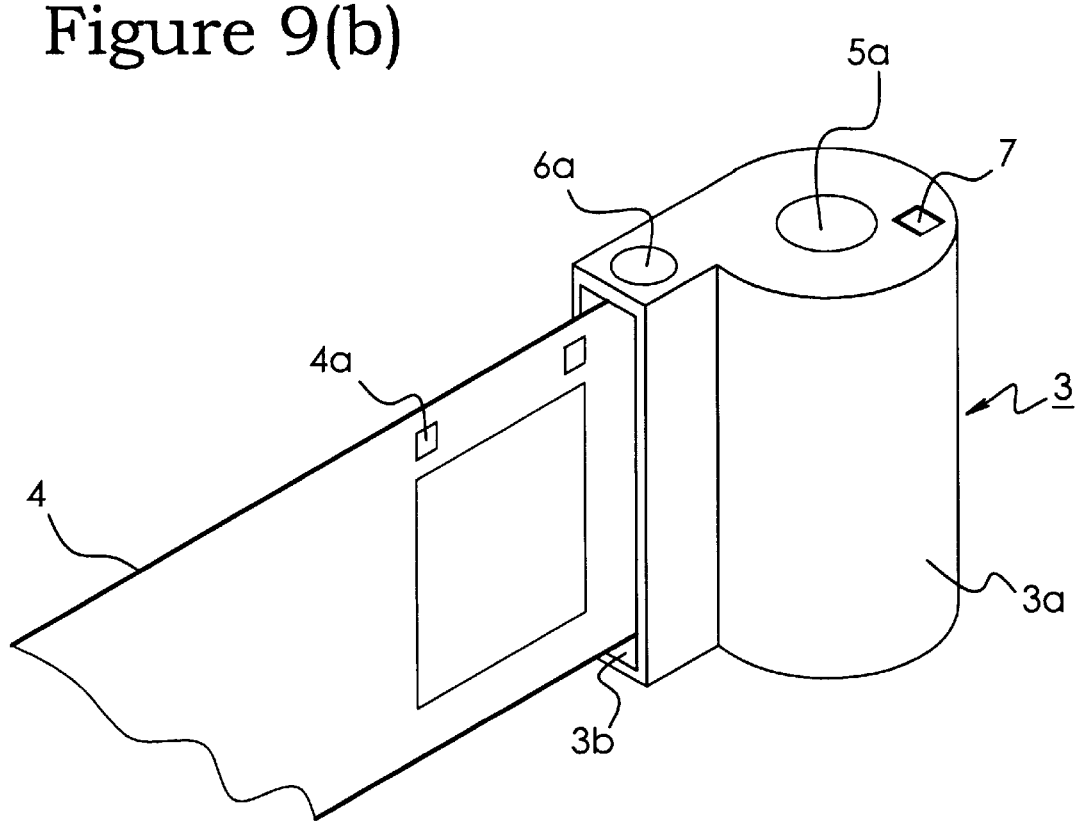
FIG. 9(b) is a diagram showing the film cartridge with a portion of the film scrolled out.
Figure 9A:
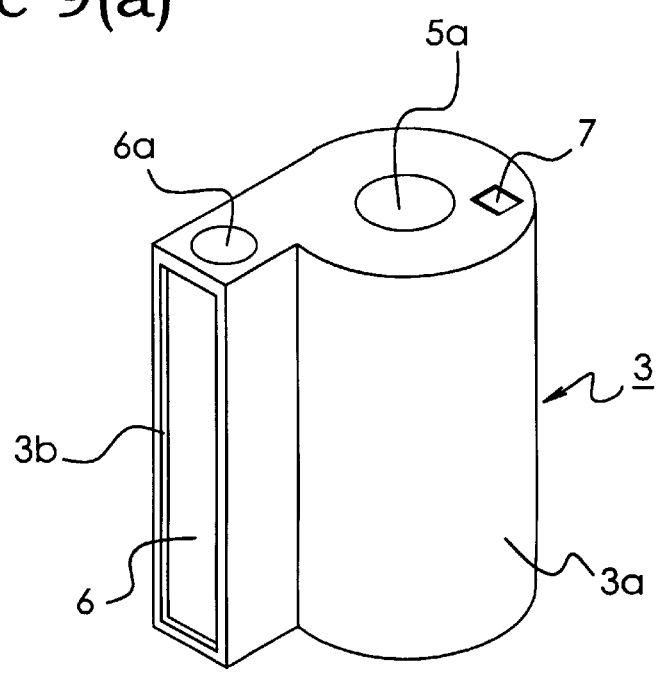
FIG. 9(a) is a diagram showing a film cartridge storing film.

A film cartridge 3 has a cartridge spool shaft 5 (not shown) capable of scrolling the film 4 out of the film cartridge 3 and rewinding the film 4 into the film cartridge 3. The film 4 winds around the cartridge spool shaft 5, as shown in FIGS. 9a and 9b. The film cartridge 3 has a case 3a supporting the cartridge spool shaft 5 so that the cartridge spool shaft 5 can rotate. Further, a light-shielding door 6 shields an opening 3b in a tangentially extending portion of the case 3a. The opening 3b is an entrance and an exit for the film 4.

Figure 8A:
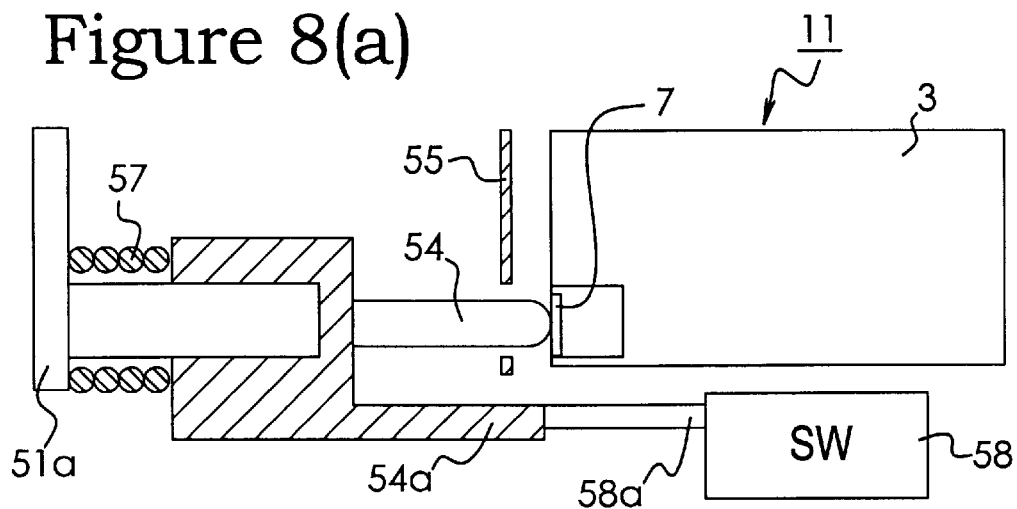
FIGS. 8(a)–(c) are drawings showing a detection unit.
Figure 8B:
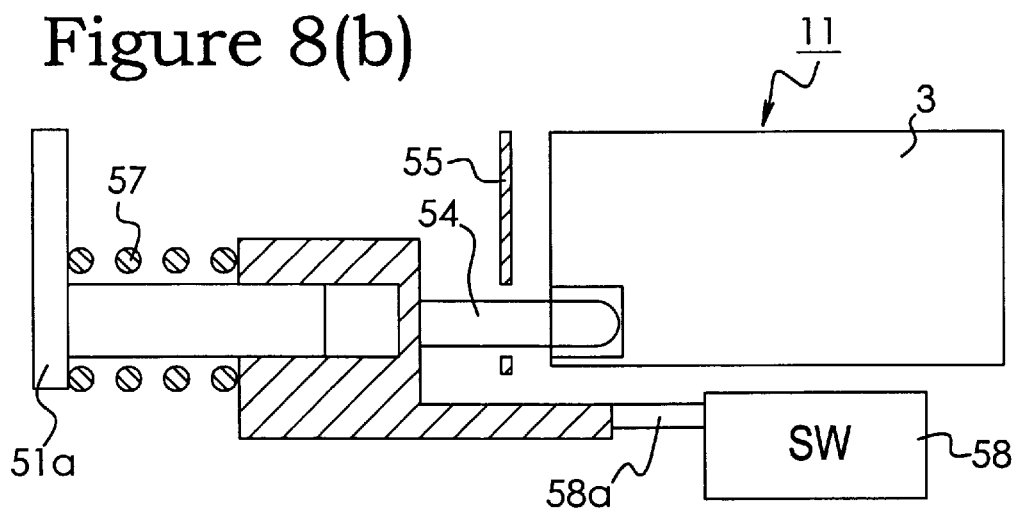
Figure 8C:
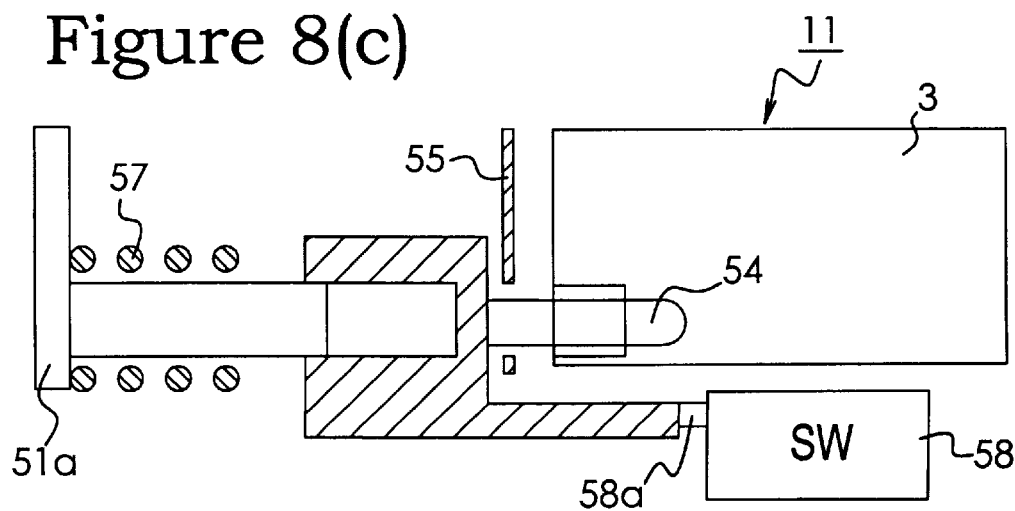

In addition, on an end surface of the film cartridge 3 is a film feeding engagement hole 5a used for rotational driving of the cartridge spool shaft 5 from outside the case 3a. The rotational driving of the cartridge spool shaft 5 scrolls out and rewinds the film 4. Similarly, an engagement hole 6a opens and closes the light-shielding door 6 via rotation from outside the case 3a. As shown in FIGS. 8a, 8b, and 8c a developing process display hook 7 identifies whether the film 4 has been developed. The display hook 7 is on the end surface of the film cartridge 3.

Film cartridge 3 markings or bar code display units (not shown) on the film cartridge 3 can indicate four states of the film 4. The four film states are unused, developed, photographed but not developed and partially developed. Hence, a detection device in the picture image input apparatus can detect the display marks and bar code display units. However, displays are not definitive criteria for determining a state of film that has been extracted at least once from the film cartridge 3 during developing. Consequently, the developing process display hook 7 is provided. The developing process display hook 7 being broken off and removed reliably indicates that the film has been developed.

Perforations 4a shown in FIG. 9b are provided on the top edge of the film 4 to indicate a photography start position and a photography end position in the film 4. The film perforations 4a also indicate a picture image input area for each frame in the film 4.

An apparatus housing or main body 8 houses the picture image input apparatus 1. A cartridge opening 9 formed in a part of a front surface 8a of the apparatus housing 8 is where the film cartridge 3 is loaded into and extracted from the picture image input apparatus 1. The opening 9 is covered by a slide cover 10 also called a cartridge slide. The slide cover 10 opens and closes the cartridge opening 9 by reciprocatably sliding on the inside of the wall surface of the housing front surface 8a. The slide cover 10 reciprocates in the direction of the wall surface (the left-to-right direction shown by the arrow in FIG. 1). The slide cover 10 is in the open state in FIG. 5 and the closed state in FIG. 6. When the cartridge opening 9 is opened, a film cartridge installation section 11 inside the housing 8 is exposed to the outside to make the film cartridge 3 loading possible. The film cartridge installation section 11 acts as a support for the film cartridge 3 inside the picture image input apparatus 1.

When the loading unit 11 is exposed to load or extract the film cartridge 3, the cover 10 does not protrude farther to the outside than the outer surface of the apparatus housing 8. Consequently, the space around the apparatus 1 can be used efficiently. In addition, the ease of loading or extracting operations for the film cartridge 3 is improved.

Exemplary components of the picture image input apparatus 1 will be described with reference to FIG. 2 and FIG. 10. Inside the housing 8 is an illuminating optical unit 21, a film feeding unit 22, a projection optical unit 24 and a main substrate 25. The illuminating optical system 21 is an illuminating device that illuminates a transmissive original medium, which can be the film 4, with light as shown in FIG. 2. The film feeding unit 22 supports the film cartridge 3 and performs the film 4 feeding. The projection optical unit 24 forms the transmitted light from the film 4 into an image on an image sensor (i.e., a CCD 23). On the main substrate 25 are circuits performing various signal processing functions. A structural substrate 26 is used to assemble various structural components.

The illuminating optical unit 21 includes an illumination base 27, an LED block 28, a toric mirror 29, and a 40° mirror 30. The illuminating optical system 21 is anchored as one unit by a screw to the structural substrate 26.

The LED block 28 light source is anchored by a screw to the illumination base 27. Further, the toric mirror 29 is rotatably attached to the illumination base 27. The toric mirror 29 can rotate about a cylindrical protrusion in the side surface. The toric mirror 29 is anchored by a screw after a rotation angle has been adjusted. The 40° mirror 30 is anchored, preferably by bonding, to a bent part formed in the illumination base 27.

The light emitted from the LED block 28 is reflected by the toric mirror 29 and then the 40° mirror 30. From the 40° mirror 30, the reflected light can pass through the film 4 to enter the projection optical unit film 24.

The projection optical unit 24 includes a 45° reflective mirror 31, a projection lens 32, a main image sensor (the CCD 23), and a projection system lid member 33. The 45° mirror 31 is anchored to the structural substrate 26. The projection lens 32 is anchored to the structural substrate 26 by a lens keep plate. A CCD substrate 35 mounting the CCD 23 is anchored by a screw (not shown) to the structural substrate 26 via a CCD holder 36.

The CCD 23 may be a monochrome line image sensor or a color image sensor. The color image sensor can have three line image sensors with color filters for red, green and blue (hereafter R, G and B) arranged in a row in a direction at right angles to the sensor axis.

In the picture image input apparatus 1, the light having passed through an arbitrary frame of the film 4 from the illuminating optical unit 21 has the optical path changed by 90° by the 45° reflective mirror 31. Then, the light reflected by the reflective mirror 31 is read by being formed by the projection lens 32 into an image on the CCD 23. The CCD holder 36 also operates to block light and prevent dust. Similarly, the projection system lid member 33 also blocks light and prevents dust for the projection optical unit 24 as a whole.

The film feeding unit 22 includes a feeding block 38 anchored by a screw (not shown) to the illumination base 27. The feeding block 38 includes a cartridge chamber 38a of the film cartridge installation section 11 for housing the film cartridge 3, an illumination opening 38b for the illuminating light and a scroll mechanism opening 38c for a roller driving mechanism 43. The opening 38b has a slit shape in the main operation direction (i.e., a pixel arrangement direction) of the CCD 23. Consequently, the curl shape of the film 4 is minimized. In addition, because the opening 38b has a slit shape, dust adhesion is reduced to the extent possible.

Figure 3:
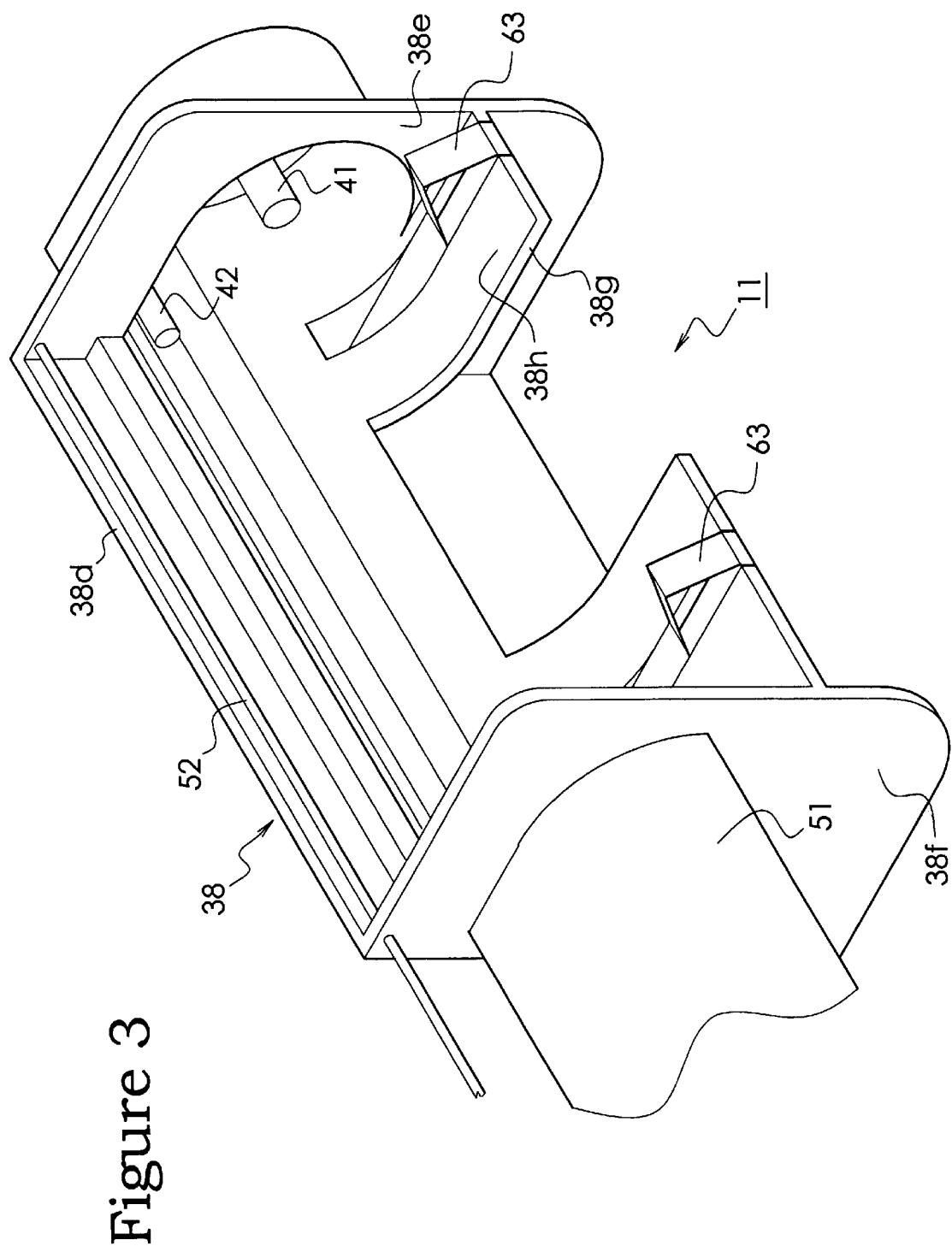
FIG. 3 is an oblique view showing a cartridge loading unit.

In addition, a winding spool 39 for winding the film 4 is at one end of the feeding block 38. A DC motor 40 drives to rotate the winding spool 39. As shown in FIG. 3, the DC motor 40 can also drive a light-shielding door shaft 42 that opens and closes the light-shielding door 6 of the film cartridge 3. The DC motor 40 also drives a fork shaft 41 that engages the cartridge spool shaft 5 (not shown) to scroll the film 4 via a gear string (not shown) from the film cartridge 3. The fork shaft 41 can also transfer the driving force of the DC motor 40 to the cartridge spool shaft 5 for rewinding. The DC motor 40 and the gear string are preferably structured for high speed feeding of the film 4.

In the feeding block 38, a roller scrolling mechanism 43 scrolls the film 4 using rollers. The roller driving mechanism 43 includes a stepping motor 46 anchored by a screw to the structural substrate 26. The stepping motor 46 can be controlled using a stepping motor drive circuit. Through low speed rotation of the stepping motor 46, a scan roller 44 is rotated to move the film 4. The scan roller 44 is supported by the feeding block 38 so as to freely rotate. In addition, a tension roller 45 is positioned facing the scan roller 44 across a path of the film 4. In this manner, the film 4 can be fed intermittently in very small intervals during reading.

The scan roller 44 is positioned slightly separated from a rail unit through which the film 4 passes. The slight separation prevents damage to the scan roller 44 and the film 4 that can be caused by constant contact with the film 4 when the DC motor 40 feeds the film 4.

The tension roller 45 also preferably has a countermeasure to avoid contacting the film 4 surface except during high precision reading. Thus, the tension roller 45 moves to separate from the film 4 during times other than high precision reading. Controlled movement of the tension roller 45 would be known to one of ordinary skill in the art. Thus, a detailed explanation is omitted.

The film feeding unit 22 feeds the film 4 in a direction orthogonal to the optical axis produced from the illuminating optical system 21 as shown in FIG. 2. The cartridge chamber 38a is positioned toward the front surface 8a of the housing 8. The winding spool 39 is positioned to the interior of the picture image input apparatus 1 and the roller driving mechanism 43 is positioned between the cartridge chamber 38a and the winding spool 39. Consequently, the picture image input apparatus 1 is compact and ease of operation is improved.

Next, the film cartridge installation section 11 will be described with reference to FIGS. 2–8. On the inside of the front surface 8a of the apparatus housing 8, the slide cover 10 is attached to reciprocatably slide along the surface direction of the front surface 8a. Further, loading of the film cartridge 3 into the housing 8 is possible by opening and closing the slide cover 10. Through this structure, the slide cover 10 does not protrude farther to the outside than the apparatus housing 8 during loading and extracting of the film cartridge 3. Accordingly, space for installing external devices around the periphery of the apparatus 1 is effectively used to improve operability.

In addition, an inner cartridge cover 51 is positioned inside the slide cover 10. The inner cartridge cover 51 is slidingly supported and preferably moves in conjunction with the motion of the slide cover 10. As shown in FIG. 3, a slide shaft 52 also slidingly connects to guard wall 38e and side wall 38f of the film feeding block 38 as a guide. Further, an end presser foot 53 connects to a base end 51a of the inner cartridge cover 51. The end presser foot 53 is positioned on the side opposite the fork shaft 41 that engages the cartridge spool shaft 5 of the film cartridge 3. In addition, a developing process detection hook 54 discriminating whether the film 4 has been developed is attached to the base end 51a of the inner cartridge cover 51.

The end presser foot 53 applies a force to an end keep plate 55 through the spring force of an end presser bar spring 56. The end presser foot 53 supports the film cartridge 3 by reliably engaging the cartridge spool shaft 5. In addition, the end presser foot 53 and the developing process detection hook 54 preferably move in conjunction with the inner cartridge cover 51 and the slide cover 10. Accordingly, the end presser foot 53 and the developing process detection hook 54 withdraw farther than the side wall 38f during loading of the film cartridge 3. Hence, the end presser foot 53 and the developing process detection hook 54 do not present an obstacle during loading of the film cartridge 3. Thus, smooth loading of the film cartridge 3 is possible.

Figure 4:
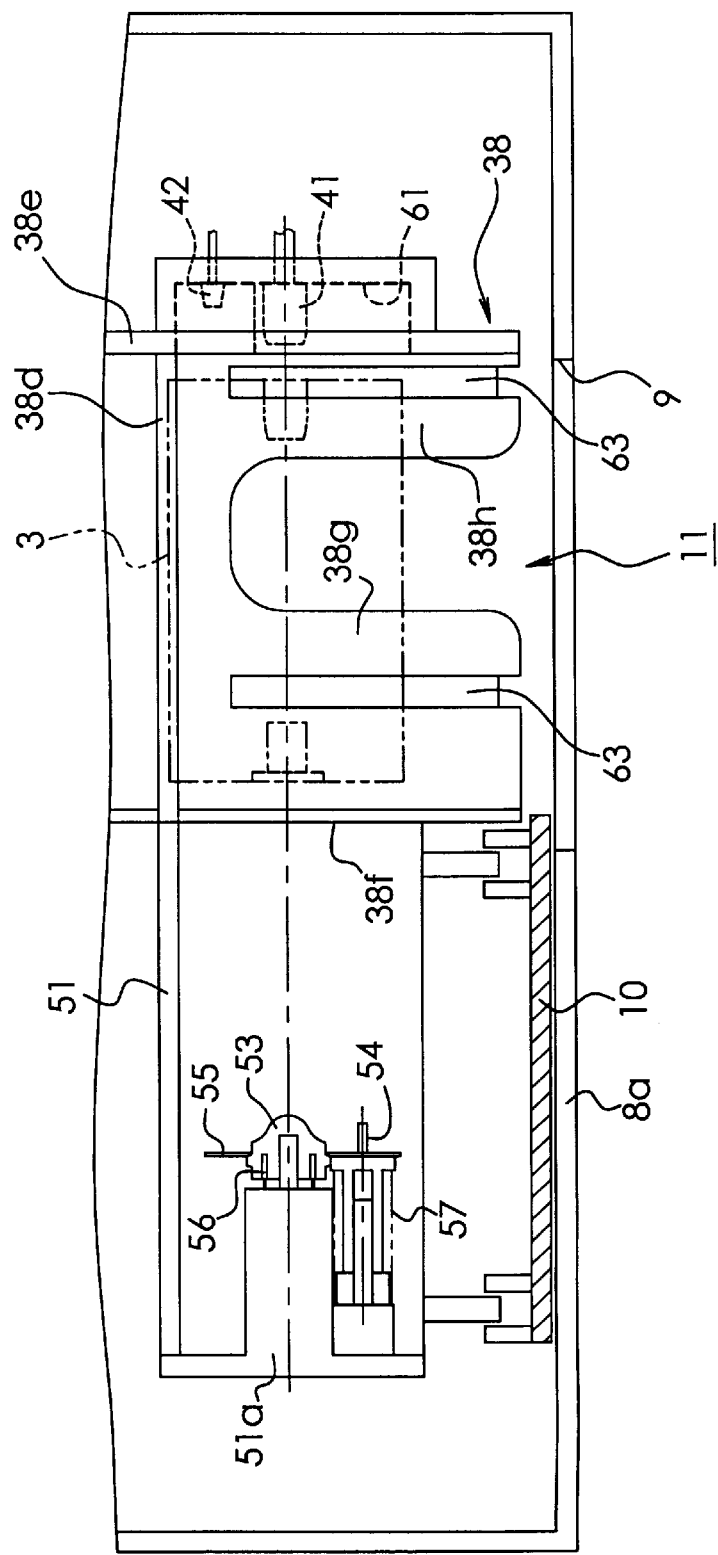
FIG. 4 is a cross-sectional view along line IV—IV in FIG. 2.
Figure 5:
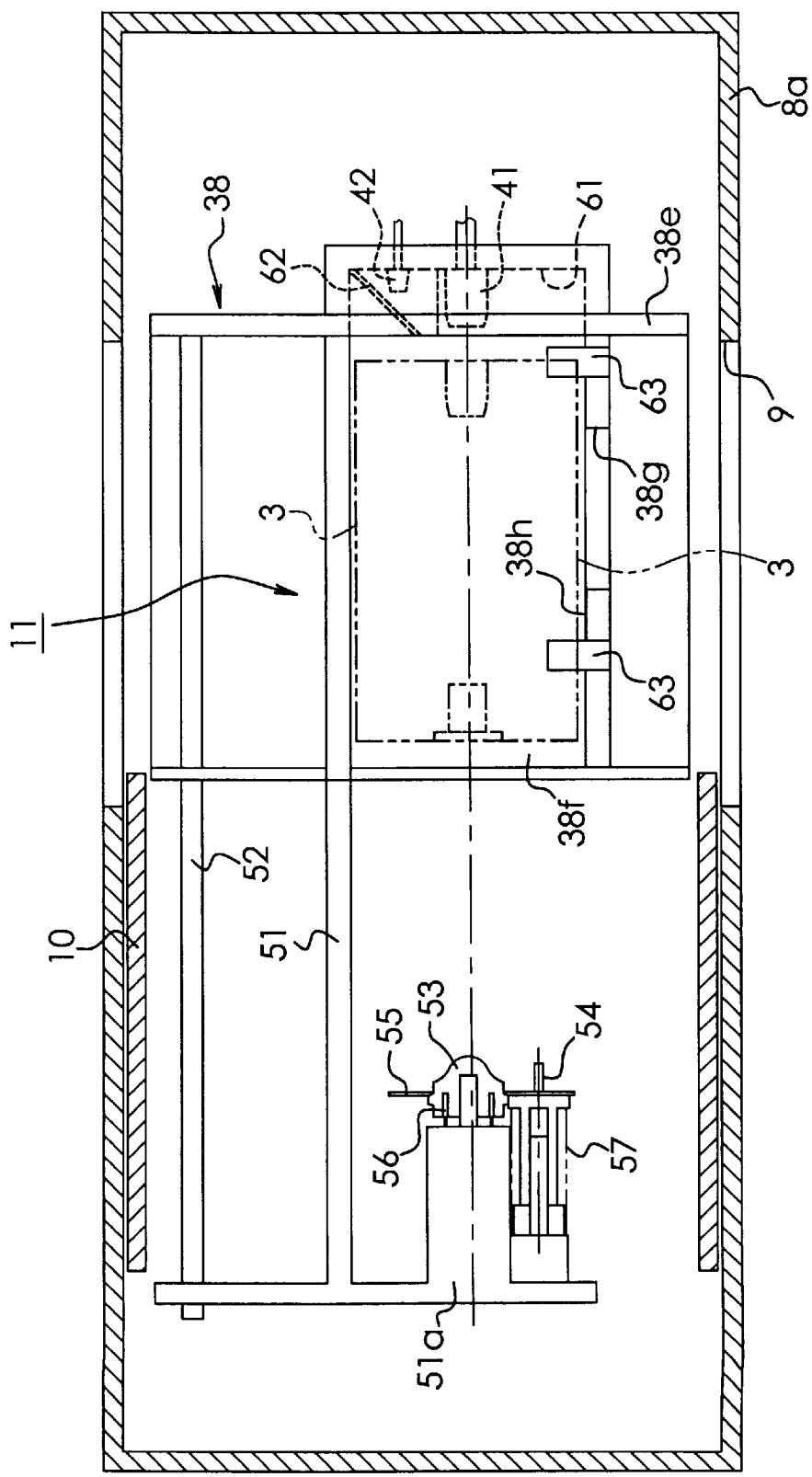
FIG. 5 is a cross-sectional view along line V—V in FIG. 2 with a slide cover open; 1
Figure 6:
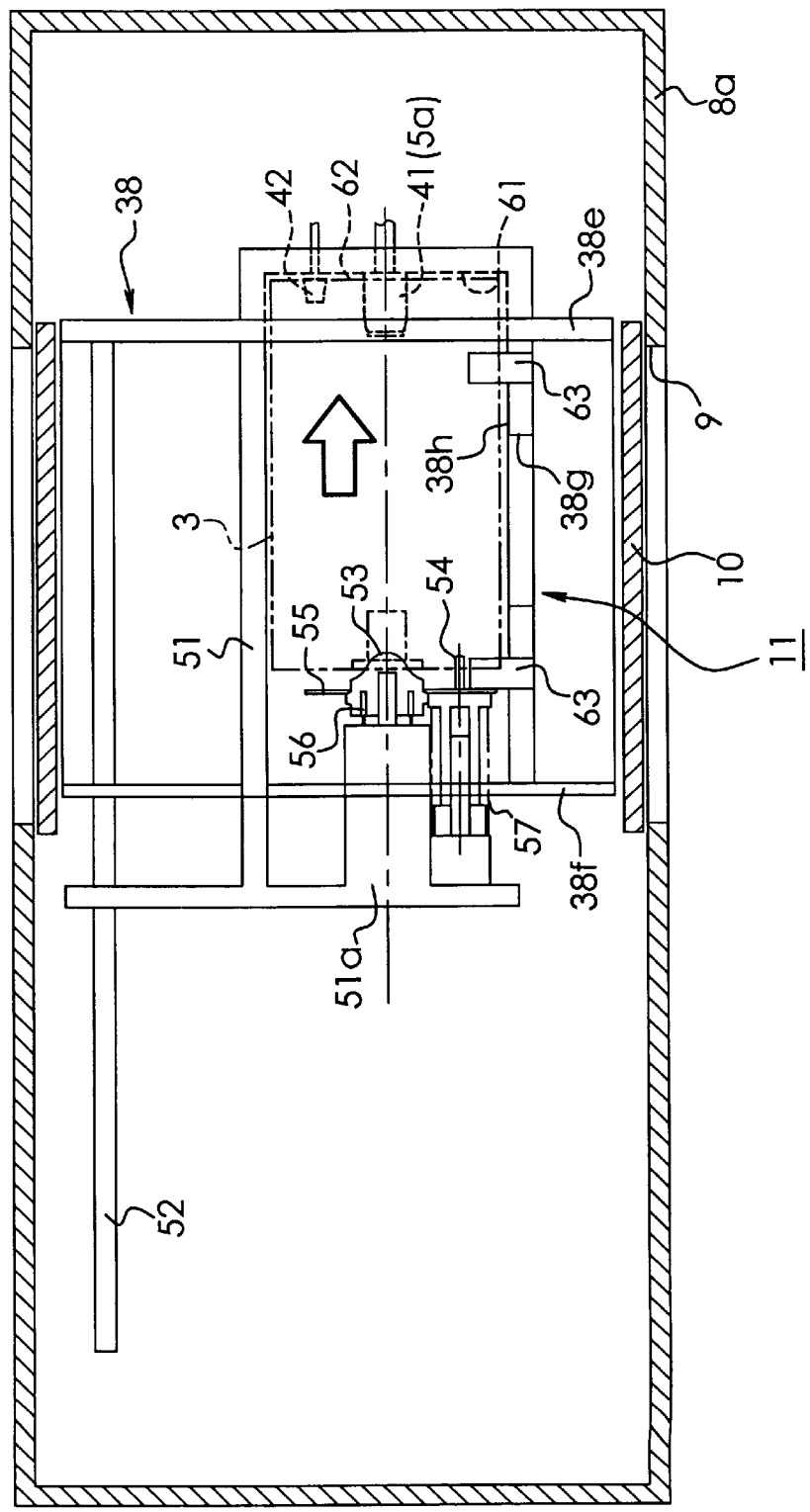
FIG. 6 is a cross-sectional view along line VI—VI in FIG. 2 with the slide cover closed.

As shown in FIGS. 4–6, the end presser foot 53 is not connected to a motor or gear string. Thus, the end presser foot 53 is positioned so as to be able to move. In contrast, the fork shaft 41 is connected to the DC motor 40 by the gear string (not shown) and anchored. The end presser foot 53 presses against and anchors a loaded film cartridge 3 in the direction of the cartridge spool shaft 5 by pressing against the cartridge spool shaft 5.

The fork shaft 41 of the picture image input apparatus 1 can be movable, however, the DC motor 40 and the gear string would then also need to move. Consequently, a complex movement device would be necessary if the fork shaft 41 were able to move. In the first preferred embodiment, the film cartridge 3 is anchored using a simple structure. In this manner, the apparatus 1 can be simply and inexpensively designed.

The developing process detection hook 54 detects whether the film 4 has been developed based on the absence or presence of the developing process display hook 7 of the film cartridge 3. When the developing-completed detection hook 54 detects the undeveloped state of the film 4, a CPU 70 determines that the film 4 is undeveloped. As shown in FIG. 10, the CPU 70 can be implemented on a special purpose computer, a programmed microprocessor or microcontroller and peripheral integrated circuit elements, an ASIC or other integrated circuit, a hardwired electronic or logic circuit such as a discrete element circuit, a programmable logic device such as a PLD, PLA, FGPA or PAL, or the like. In general, any device on which a finite state machine capable of implementing the flowcharts shown in FIGS. 11–12 can be used to implement the CPU 70. The CPU 70 can include internal or external memory 71. Alternatively, the computer 2 could be used to implement the flowcharts shown in FIGS. 11–12 commands to the picture image input apparatus over a SCSI interface 72. Further, the CPU 70 outputs an undeveloped film signal to the host computer 2. The host computer 2 can display that the film 4 of the film cartridge 3 is undeveloped using a display apparatus (not shown).

The developing process detection hook 54 also detects the absence or presence of the film cartridge 3 in the loading unit 11. When the developing process detection hook 54 detects that the film cartridge 3 is absent, the CPU 70 outputs a cartridge absent signal (e.g., a film cartridge unloaded signal) to the host computer 2. The host computer 2 can display the unloaded status of the film cartridge 3.

Detections by the developing process detection hook 54 will be described with reference to FIGS. 8(a)–(c). When the slide cover 10 is closed, an end 54a of the developing process detection hook 54 makes contact with a detection switch 58. The detection switch 58 preferably attaches to the feeding block 38. The detection switch 58 detects at least the respective differences among three positions of the developing process detection hook 54. As shown in FIGS. 8(a)–(c), a detection hook spring 57 applies force to the detection hook 54 in a detection direction away from the base end 51a. If the film cartridge 3 loaded in the loading unit 11 is undeveloped, the detection hook 54 is in the position shown by "A" in FIG. 8a. When a developed film cartridge 3 has been loaded, the detection hook 54 is in the position shown by "B" in FIG. 8b. Further, if the film cartridge 3 is not loaded in the loading unit 11, the detection switch 58 reaches the position shown by "C" in FIG. 8c.

The detection hook 54 and the detection switch 58 detect whether the film 4 has been developed and whether the film cartridge 3 is loaded in the loading unit 11. The detection switch 58 detects movement of the detection hook 54 using differences among three positions. Thus, three states of the film cartridge 3 are detected by single detection member such as the detection switch 58. Consequently, the number of components used as the cartridge detection unit are reduced to a minimum. The detection switch 58 can be an electrical switch such as a stroke sensor detecting at least three positions of a stroke.

The guard wall 38e in the film feeding block 38 prevents damage to the fork shaft 41 caused by impacting the film cartridge 3 during loading of the film cartridge 3. A notch 61 is provided in the guard wall 38e. The fork shaft 41 and a light-shielding door shaft 42 are positioned on the floor of the notch 61. The fork shaft 41 and light-shielding door shaft 42 do not protrude to the loading unit 11 side of the guard wall 38e. Thus, damage to the fork shaft 41 is prevented during cartridge 3 loading.

In this embodiment, the relative position between the guard wall 38e and the fork shaft 41 is constant. However, the invention is not intended to be limited to this positioning. Thus, the fork shaft 41 could withdraw from the loading unit 11 to the notch 61 side of the guard wall 38e only during loading of the film cartridge 3, for example.

A discharge spring 62 is within the notch 61 as shown in FIGS. 5–6. The discharge spring 62 accumulates an energizing force when the film cartridge 3 is loaded into the loading unit by being pressed into the notch 61. Further, the discharge spring 62 causes the film cartridge 3 to move toward the loading unit 11 side from within the notch 61 when the inner cartridge cover 51 and slide cover 10 are opened.

A cartridge loading spring 63 is also attached to a receiving wall 38h of the film cartridge installation section 11 in the film feeding block. In addition, a "click" feeling is preferably obtained by an operator when the film cartridge 3 has been loaded because of the receiving wall 38h of the feeding block 38 and the loading spring 63. The loading spring 63 supports the film cartridge 3 regardless of the posture of the picture image input apparatus 1. Thus, even when the apparatus 1 held vertical, the film cartridge 3 is stable in the loaded position.

As shown in FIG. 5, the film cartridge 3 is loaded between the feeding block side wall 38f and the guard wall 38e of the fork shaft 41 by pushing aside the loading spring 63. When the slide cover 10 is closed, the film cartridge 3 moves into the notch 61 to engage the fork shaft 41 under force from the end presser foot 53 as shown in FIG. 6. When the slide cover 10 is opened, the film cartridge 3 is pressed toward the side wall 38f of the feeding block 38 by the discharge spring 62.

In addition, the receiving wall 38h of the loading unit 11 in the film feeding block 38 preferably has a roughly U-shaped cut 38g as shown in FIGS. 3–4. Thus, the user can extract the film cartridge 3 from the loading unit 11 simply by grasping the film cartridge 3 up with their fingers or the like.

In addition, the inner cartridge cover 51 can be formed to cover the top half of the film cartridge 3 loaded in the loading unit 11 when the outer cover 10 is closed. In this manner, the film cartridge 3 is stably held in the loaded position. In particular, the inner cartridge cover 51 holds the film cartridge 3 in conjunction with the loading spring 63, as shown in FIG. 2.

Figure 7A:
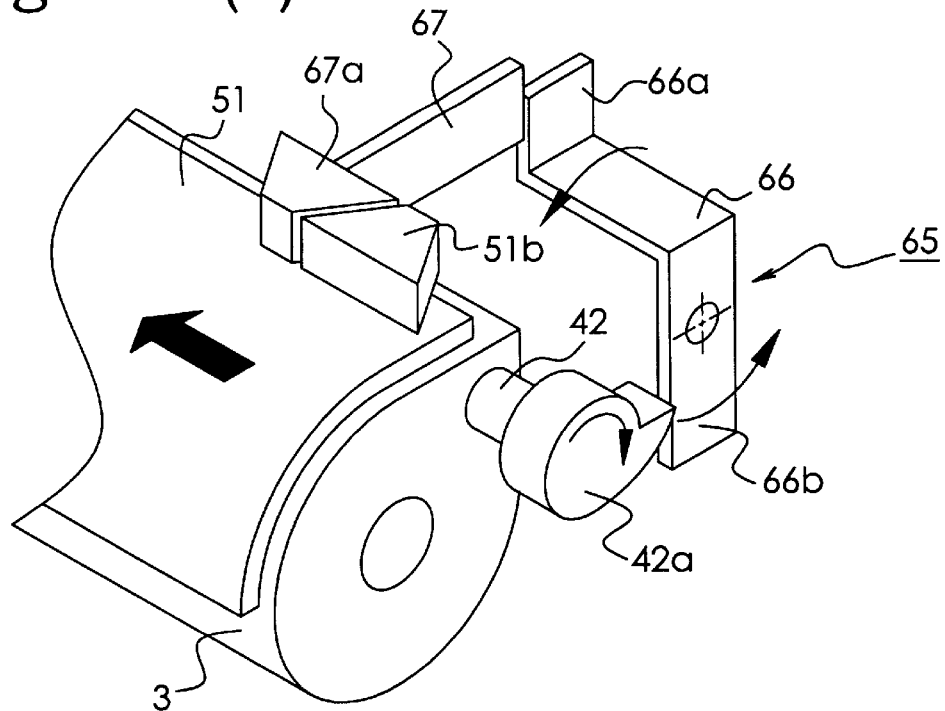
FIG. 7(a) shows a locking mechanism that locks a cartridge cover in a cartridge loading unit in the locked state.
Figure 7B:
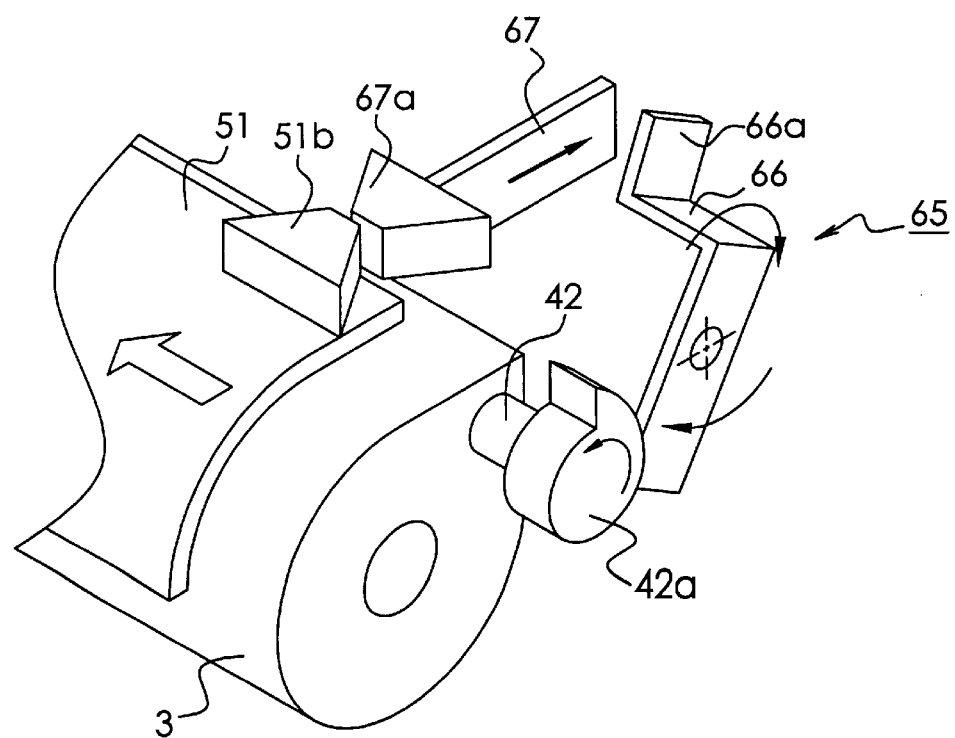
FIG. 7(b) shows the locking mechanism of FIG. 7(a) in the open state.

As shown in FIGS. 7(a)–(b), a locking mechanism 65 on the inner cartridge cover 51 can lock the inner cartridge cover 51 to prevent it from unintentionally opening. The locking mechanism 65 achieves a locked position when the light-shielding door 6 of the film cartridge 3 is opened in the loaded film cartridge 3.

The locking mechanism 65 has a flange-shaped cam 42a on one part of the light-shielding door shaft 42. The light-shielding door shaft 42 engages the engagement hole 6a to open and close the light-shielding door 6. In addition, a light-shielding lever 66 rotates around a support shaft (not shown) that is parallel to the light-shielding door shaft 42. The light-shielding lever 66 rotates in conjunction with the motion of the light-shielding door shaft 42, by means of the cam 42a, which contacts a first end 66b of the light-shielding lever 66.

A locking unit 51b is on one part of the cartridge cover 51. A locking plate 67 has a locking unit 67a that engages the locking unit 51b. The locking unit 67a moves between two positions when the locking plate 67 withdraws and advances, respectively. A first position of the locking plate 67 engages the locking unit 67a as shown in FIG. 7a. A second position of the locking plate 67 does not engage the locking unit 67a as shown in FIG. 7b.

First, the case where the cartridge cover 51 is locked is described with reference to FIG. 7a. The locking plate 67 is initially forced by a force-applying device (not shown) so that the locking unit 67a does not engage the locking unit 51b. The flange-shaped cam 42a presses on the light-shielding lever 66 in conjunction with the light-shielding door shaft 42 opening the light-shielding door 6. In particular, when the light-shielding door shaft 42 rotates clockwise (CW) the light-shielding lever 66 rotates counterclockwise (CCW) to the position shown in FIG. 7a. In this manner, a second end 66a of the light-shielding lever 66 engages the end of the locking plate 67 and move the locking plate 67 to the engagement position. The light-shielding lever 66 holds the locking plate 67 fixed in the engagement position to prevent movement of the locking plate 67. Thus, the inner cartridge cover 51 is locked and the slide cover 10 cannot be opened.

Next, releasing the locking mechanism 65 of the inner cartridge cover 51 is described with reference to FIG. 7b. The flange-shaped cam 42a releases the pressure on the light-shielding lever 66 in conjunction with the light-shielding door shaft 42 closing the light-shielding door 6. To close the light shielding door 6, the light-shielding lever 66 rotates clockwise to the position shown in FIG. 7b. In this position, the second end 66a of the light-shielding lever 66 is released from engagement with the locking plate 67. Thus, the locking plate 67 can withdraw from the engagement position. When the locking plate 67 is withdrawn, the inner cartridge cover 51 can be moved in the direction indicated by the arrow in FIG. 7b in conjunction with the opening of the slide cover 10 because the locking unit 51b is not pressed by the locking unit 67a. Thus, the inner cartridge cover 51 can be opened.

Figure 10:
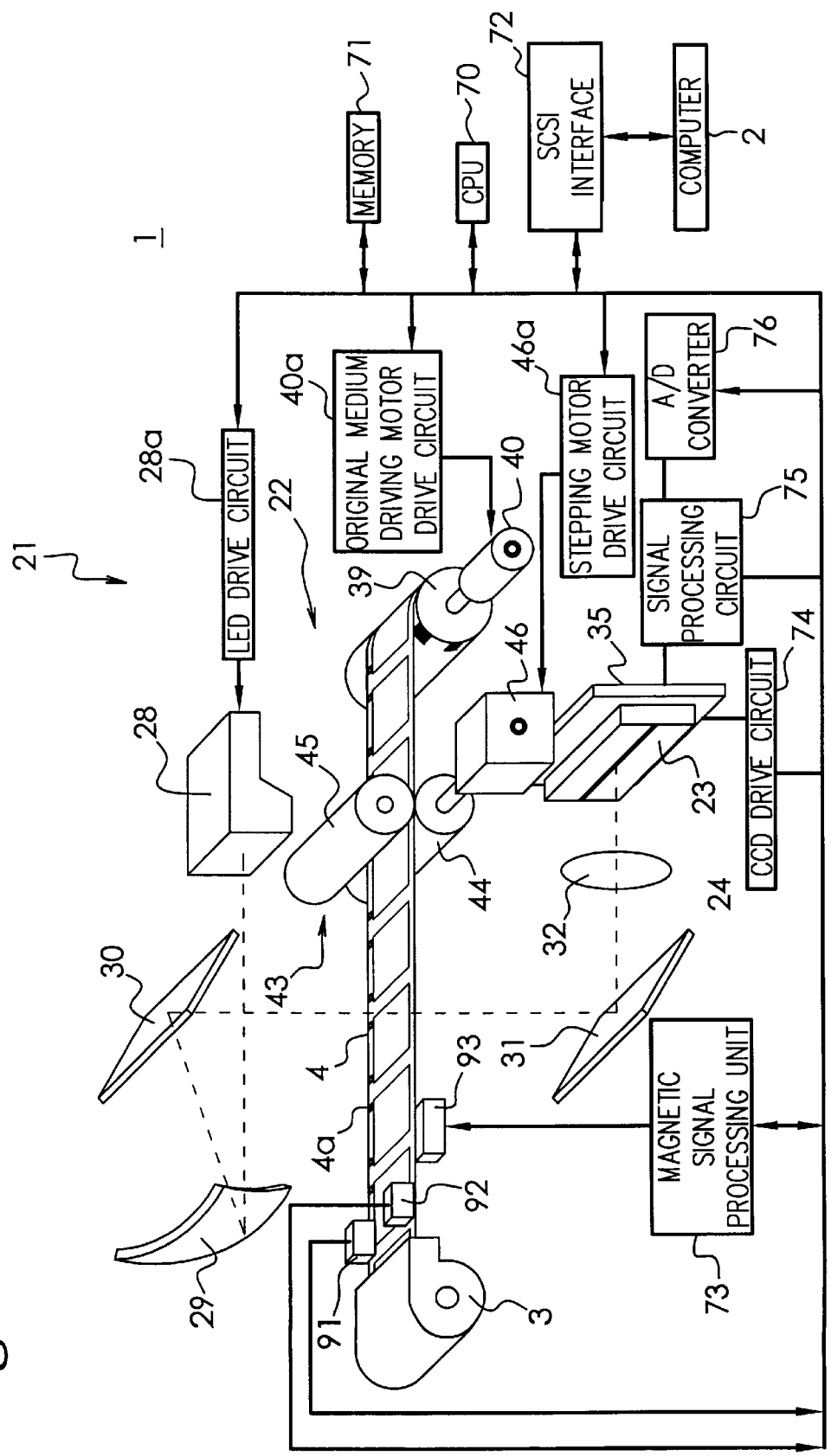
FIG. 10 is a block diagram of a picture image input system.

FIG. 10 is a block diagram of a picture image input system including the picture image input apparatus 1 and the host computer 2. An electrical control system in FIG. 10 includes driving circuits and processing circuits for each of the above-described mechanisms. In particular, an LED drive circuit 28a drives the LED block 28. The stepping motor drive circuit 46a and an original medium driving motor drive circuit 40a drives the stepping motor 46a and the DC motor 40, respectively. A magnetic signal processing circuit 73 is connected to at least a magnetic head 93. Further, an A/D converter 76 is connected to a signal processing circuit 75 coupled to the CCD substrate 35. Finally, a CCD drive circuit 74 is connected to the CCD 23. Such an electrical control system would be known to one of ordinary skill in the art. Accordingly, detailed explanation of each is omitted.

As shown in FIG. 10, sensors 91 and 92 detect the scrolling position of the film 4. The sensors 91 and 92 detect the film perforations 4a formed in the side edges of the film 4 scrolled from the film cartridge 3. In addition, the magnetic head 93 reads or writes information for various types of photography information in the magnetic memory area on one side edge of the film 4.

Figure 11:
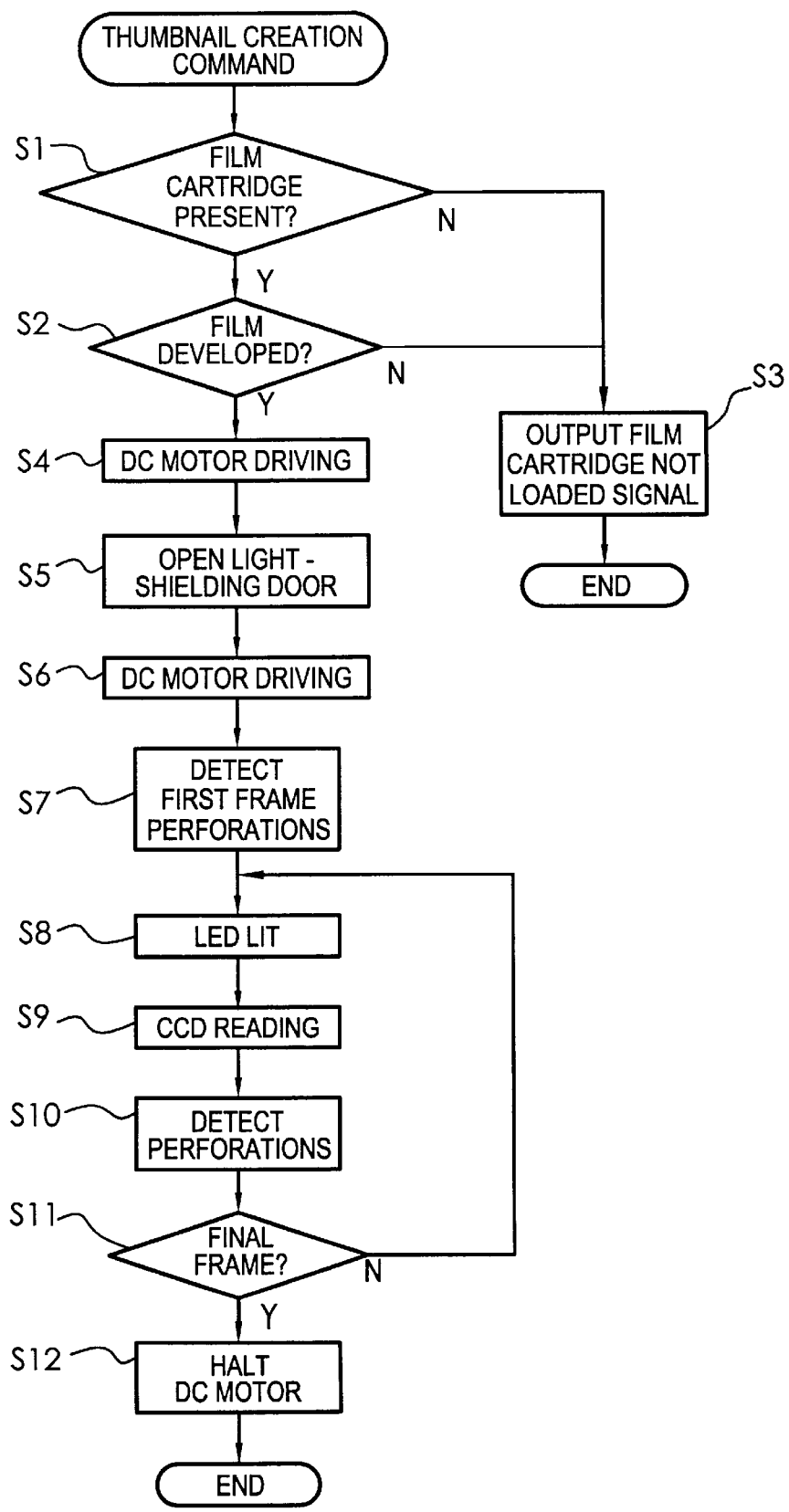
FIG. 11 is a flowchart showing an exemplary control sequence of a controller of the picture image input apparatus of FIG. 1 for a thumbnail creation process.
Figure 12:
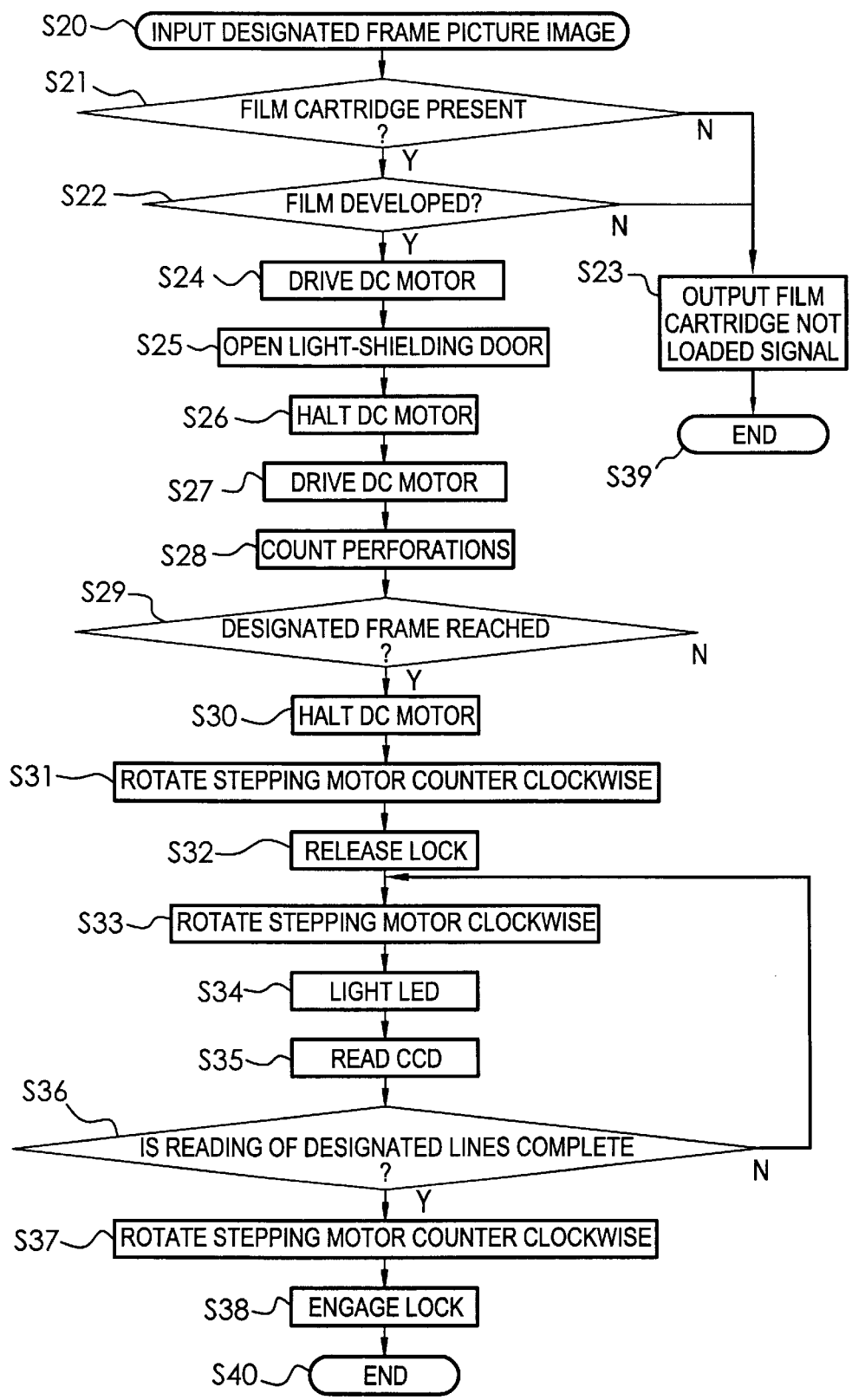
FIG. 12 is a flowchart showing an exemplary control sequence of the controller of the picture image input apparatus of FIG. 1 for a designated frame picture image input process.

FIG. 11 is a flowchart showing an exemplary control sequence of the picture image input apparatus 1 during a thumbnail creation process. FIG. 12 is a flowchart showing an exemplary control sequence of the picture image input apparatus 1 during a designated frame picture image input process.

The thumbnail creation process reads out the film information in the film cartridge 3. As shown in FIG. 11, the thumbnail creation process starts when a film cartridge 3 is loaded into the loading unit 11 of the picture image input apparatus 1 and a thumbnail creation command to read the film information in the film cartridge 3 is produced by the host computer 2. When the thumbnail creation command is received by the picture image input apparatus 1, control advances to step S1.

In step S1, a determination is made regarding the film cartridge 3 status. Based on the signal from the detection switch 58 acting under the motion of the developing process detection hook 54, in step S1 it is determined whether the film cartridge 3 is loaded. When the determination in step S1 is affirmative because the film cartridge 3 is loaded, control advances to step S2. When the determination in step S1 is negative, control advances to step S3.

In step S2, a determination is made whether the film 4 in the loaded film cartridge 3 is developed. The determination is made based on the signal output from the detection switch 58 acting under the motion of the developing-completed detection hook 54. When the determination is affirmative because the film 4 is developed, control advances to step S4.

When the determination in step S2 is negative, control advances to step S3. In step S3, a cartridge unloaded signal indicating that the film cartridge 3 is not loaded is output to the host computer 2 and the process ends. The host computer 2 can display on the display apparatus the unloaded status of the film cartridge 3.

In step S4, the DC motor 40 is driven. From step S4, control advances to step S5 where the DC motor 40 driving rotates open the light-shielding door 6. From step S5 control advances to step S6.

In step S6, driving the DC motor 40 drives the winding spool 39 and the fork shaft 41 to feed the film 4. In this way, the film 4 is scrolled. Preferably, a gear string connected to the DC motor in step S4 and step S6 are different gear strings. From step S6, control advances to step S7.

In step S7, a film perforation 4a of the first frame on the film 4 is detected by the sensors 91 and 92. Film scrolling can be controlled, for example, by the CPU 70 using detecting signals output by the sensors 91 and 92. From step S7, control advances to step S8.

In step S8, the condition that the first frame of the film 4 is at the picture image reading position is detected and the LED block 28 is lit up. From step S8, control advances to step S9.

In step S9, the picture image light signal of the first frame of the film 4 created by the light from the LED block 28 is read by the CCD 23 while the film 4 is fed. From step S9, control advances to step S10. In step S10, the sensors 91 and 92 detect the perforations 4a, which are used to determine the frame number of the film 4. From step S10, control advances to step S11.

In step S11, a determination is made whether the film 4 has been scrolled to the final frame based on the film frame number information from the detection of the perforations 4a in step S10. When the determination in step S11 is affirmative because the frame is the final frame, control advances to step S12. In step S12, the DC motor 40 is halted and the process ends.

However, when the determination in step S11 is negative because the frame is not the final frame, control returns to step S8 and the process steps S8–S11 are repeatedly performed.

When the picture images are read while the film 4 is being fed by the DC motor 40 at high speed in the auxiliary scanning direction, it is very difficult to read the detailed information of the film 4. The auxiliary scanning direction is orthogonal to the primary scanning direction. Thus, the thumbnails created by the thumbnail creation process verify the picture image information in the film cartridge 3 and verify which frame numbers have the picture image information required by the user.

Next, a designated frame picture image input process is described with reference to FIG. 12. The designated frame picture input process reads the picture image information of a selected frame number of the film 4 in the film cartridge 3. The designated frame picture image input is performed, for example, when the user knows beforehand the frame number containing the required picture image information. Thus, the designated frame picture image input process is generally performed to obtain highly detailed picture image reading when thumbnails have already been created.

As shown in FIG. 12, the process starts, for example, when a designated frame number is input from the host computer 2. When the designated frame number is received, control advances to step S21. In the designated frame picture image input process, the process steps S21–S25 that open the light-shielding door 6 in the film cartridge 3 are the same as steps S1–S5 in FIG. 11. Thus, detailed description of steps S21–S25 is omitted.

From step S25, control advances to step S26. In step S26, the DC motor 40 is temporarily halted after the light-shielding door 6 has been opened in step S25. From step S26 control advances to step S27, where the DC motor 40 is again driven to scroll the film 4 up to the designated frame number. From step S27, control continues to step S28.

In step S28, the perforations are counted using the sensors 91 and 92. From step S28, control advances to step S29 where a determination is made whether the designated frame has been reached. When the determination is negative in step S29 because designated frame has not been reached, control returns to repeat the process steps S27–S29. When the determination in step S29 is affirmative because the designated frame has been reached, control advances to step S30, where the DC motor 40 is again halted to stop the film 4 at the designated frame number.

Following this, from step S30 control advances to step S31 where the stepping motor 46 is rotated in a counter-clockwise direction. From step S31, control advances to step S32 where the stepping motor 46 is driven up to a designated pulse number. Through the driving of the stepping motor 46, the lock state of the roller driving mechanism 43 is released and the tension roller 45 presses against the scan roller 44 across the film 4. From step S32, control advances to step S33.

In steps S33–S35, a picture image is illuminated and read while the film 4 is halted after the stepping motor 46 rotates in the clockwise direction to advance the film 4 an amount based on the pitch of reading the picture image of the designated frame. In other words, in step S33, the film 4 is fed at low speed by the stepping motor 46. From step S33, control advances to steps S34 where the LED block 28 is lit. From step S34, control advances to step S35 where the picture image is read by the CCD 23. The process of steps S34–S35 is similar to steps S8–S9 in FIG. 11. Through this kind of reading, it is possible to obtain high resolution picture image information with high precision from the one frame of the film 4 designated by the user. From step S35, control advances to step S36.

In step S36, a determination is made whether the reading of the designated number of lines has been completed. When the determination is negative, control returns to step S33 and the process steps S33–S36 are repeated. When the determination in step S36 is affirmative, control advances to step S37.

In step S37, the stepping motor 46 rotates in the counterclockwise direction to separate the tension roller 45 from the film 4. From step S37, control advances to step S38 where the roller driving mechanism 43 is locked. In this manner, the picture image input device is prepared for movement to the next frame number desired by the user. The process in step S38 prevents deforming caused by the rollers 44 and 45 and the film 4 pressing against each other. However, when picture image reading of successive neighboring frames is performed, steps S37–S38 are preferably skipped because the picture image reading is accomplished in succession while the tension roller 45 remains in a pressing state.

The frame number in the film 4 can be verified by counting the perforations 4a formed on one side edge of the film 4 using the sensors 91 and 92. In addition, when the image reading performed during either the picture image thumbnail creation process or the designated frame picture image input process is concluded, the film cartridge 3 is extracted from the picture image input apparatus 1. The film cartridge can be ejected using an eject command input from the host computer 2. In response to the eject command, the picture image input apparatus 1 causes the DC motor 40 to rotate in reverse, rewinding is accomplished, the light-shielding door 6 is closed after rewinding is completed, and the film cartridge 3 can then be extracted.

A second preferred embodiment of the picture image input apparatus according to the present invention will be explained with reference to FIGS. 13 and 14. The second embodiment differs from the first embodiment in the film cartridge installation section 11. In both embodiments, the film cartridge installation section 11 prevents damage to the fork shaft 41 during film loading. In the first embodiment described above, the fork shaft 41 and guard wall 38e are fixed, and the fork shaft 41 and the cartridge spool shaft 5 engage in connection with the opening and closing of the slide cover 10.

In the second preferred embodiment, the fork shaft 41 and a guard block 95 become a withdrawing mechanism during loading or removal of the film cartridge 3. Thus, the guard block 95 moves relative to a feeding block wall 38i.

Figure 13:
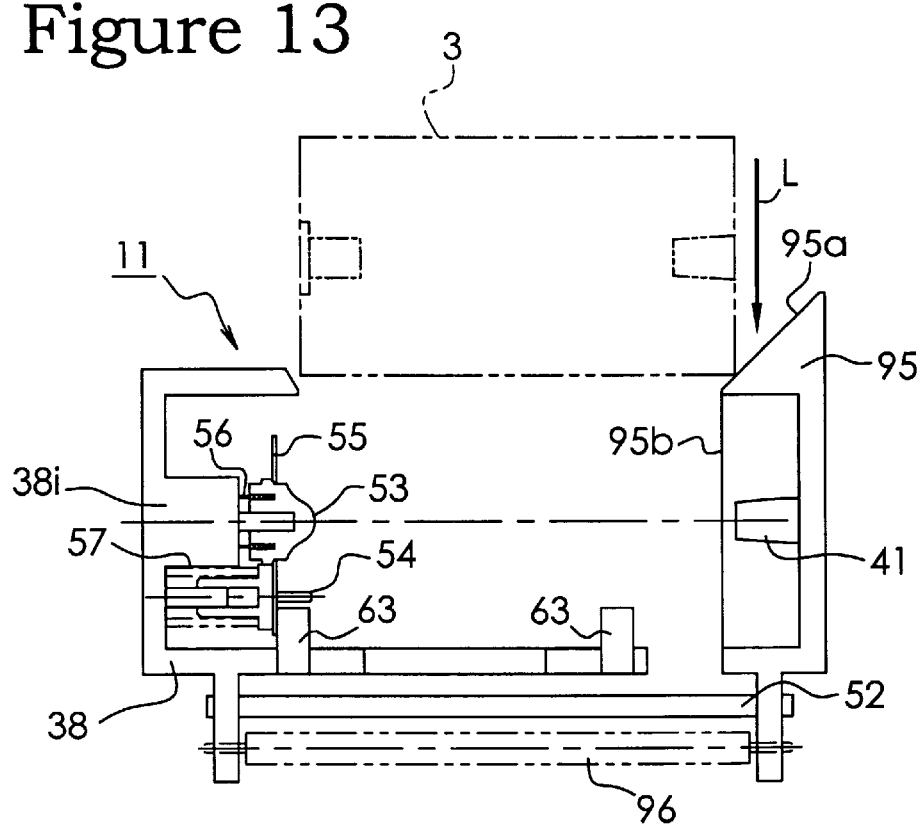
FIG. 13 is a diagram showing a cross-sectional view of a cartridge loading unit of another embodiment of a picture image input apparatus according to the present invention.
Figure 14:
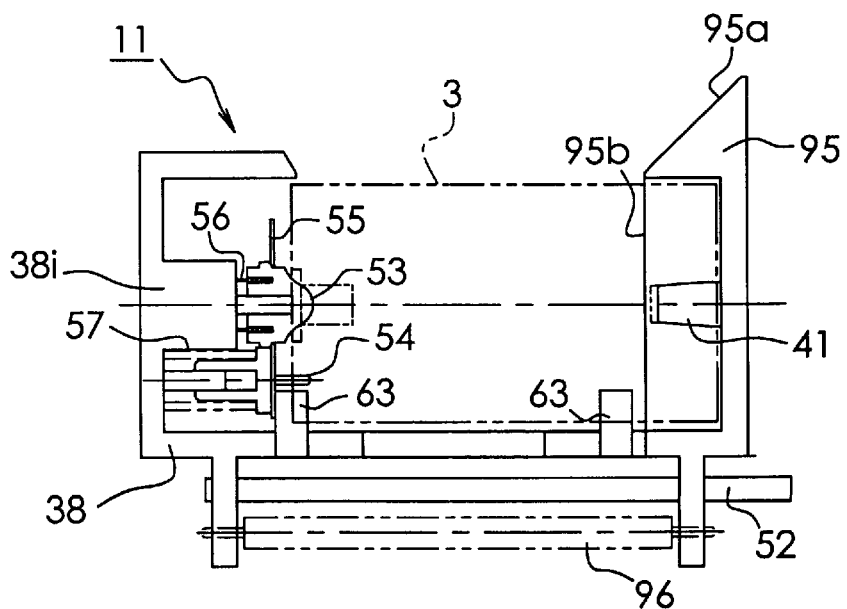
FIG. 14 is a diagram showing a cross-sectional view of the cartridge loading unit of FIG. 13 with a film cartridge loaded.

As shown in FIG. 13, the end presser foot 53 is fastened to a feeding block wall 38i which is at one end of the film cartridge installation section 11. At the other end of the film cartridge installation section 11 is the guard block 95. The guard block 95 and the feeding block wall 38i of the film feeding block 38 are slidingly attached to the slide shaft 52. Also, the end presser foot 53 is forced toward the side of the fork shaft 41 by the torsional force of the end presser bar spring 56.

A drive unit (not shown) is fastened to the guard block 95. A drive mechanism (not shown) can be housed in the drive unit to drive the fork shaft 41 and the light-shielding door shaft 42. The guard block 95 is forced by a block spring 96 in the direction of the end presser foot 53 along guide direction of slide shaft 52. The block spring 96 forces both the end presser foot 53 and fork shaft 41 toward each other along the slide shaft 52.

Next, one method of loading the film cartridge 3 into film cartridge installation section 11 is explained. When the user pushes the film cartridge 3 into film cartridge installation section 11, the film cartridge 3 comes into contact with sloping section 95a as shown in FIG. 13. A loading direction L is shown by an arrow in FIG. 13. The sloping section 95a preferably has an angle less than 90° relative to the loading direction L of film cartridge 3. When the user presses the film cartridge 3 in the loading direction L while contacting the sloping section 95a, the guard block 95 moves away from the end presser foot 53 against the force of the block spring 96. The end presser foot 53 also can move to withdraw during loading of the film cartridge 3. Before the film cartridge 3 is inserted into an opening of the guard block 95, one end of the film cartridge 3 advances while sliding against protrusion 95b of the guard block 95. The opening in the guard block 95 can be similar to the notch 61, for example. Using this mechanism, the guard block 95 guards the fork shaft 41 during film loading and unloading.

When the film cartridge 3 is inserted into the opening of the guard block 95, the guard block 95 moves towards the end presser foot 53 along the guide direction of the slide shaft 52 under the force of the block spring 96. As a result, the cartridge spool 5 of the film cartridge 3 and the fork shaft 41 engage as shown in FIG. 14. Further, the end presser foot 53 engages the spool shaft 5.

To remove the film cartridge 3, the user may push the guard block 95 by hand in the direction away from the end presser foot 53 against the force of the block spring 96. Then, the user may remove the film cartridge 3.

The present invention is not limited to the structure described in the above-described embodiments because it is possible to appropriately change or alter the shape, structure or the like of the various components in the picture image input apparatus 1. For example, the structure of the illuminating optical unit 21, the film feeding unit 22 and the projection optical unit 24 or the like can be freely altered as is suitable.

The IX 240 type film and cartridge of the Advanced Photo System standard is preferably used in the above embodiments. The IX 240 type film includes a picture image memory area and a magnetic memory area used to display various photography information on the surface of 24 mm wide silver halide film. For this cartridge and film, the development status of the film and therefore the cartridge can be discriminated by the absence of a selectively removed developing process display hook on the cartridge.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An image input apparatus, comprising:
   a support device that supports a cartridge having an original document support shaft, the support device including a catridge support shaft, wherein the cartridge houses a transparent original document wound around the support shaft;
   a feeding device that feeds the transparent original document scrolled from the cartridge;
   all illumination device that illuminates the transparent original document with light;
   a reading device that forms an image front the light that passed through the transparent original document and reads the image;

15 a cover provided on a surface of an exterior wall of an apparatus housing, wherein the cover reciprocates between an open position that exposes the support device and a closed position that covers the support device; and a pressing member positioned on a side of the cartridge opposite the cartridge support shaft that presses the cartridge toward the cartridge support shaft, wherein the pressing member moves in response to movement of the cover.

2. The image input apparatus of claim 1, wherein the cover reciprocates between the open position and the closed position by sliding substantially parallel to the exterior wall.

3. The image input apparatus of claim 2, wherein in the open position and the closed position the cover does not protrude beyond the outer surface of the apparatus housing.

4. The image input apparatus of claim 2, wherein the feeding device comprises a feeding shaft that feeds the transparent original document by engaging the support shaft, wherein the feeding shaft engages the support shaft in conjunction with a movement of the cover from the open position to the closed position.

5. The picture image input apparatus of claim 2, wherein a loading unit of the support device comprises:

a cartridge support shaft; and a guide unit that guides the cartridge toward the cartridge support shaft, wherein the guide unit guides the cartridge in conjunction with the closing movement of the cover, and wherein the cartridge support shaft supports the cartridge when the cover is in the closed position.

6. The image input apparatus of claim 5, wherein the guide unit further comprises a locking mechanism that prevents unintentional opening of the cover.

7. An image input apparatus, comprising:

a support device that supports a cartridge having an original document support shaft, wherein the cartridge houses a transparent original document wound around the support shaft, wherein the support device includes a single detection device that detects whether the transparent original document is developed and detects whether the cartridge housing the transparent original document is loaded in the support devices;

a feeding device that feeds the transparent original document scrolled from the cartridge;

an illumination device that illuminates the transparent original document with light;

a reading device that forms an image from the light that passed through the transparent original document and reads the image; and a cover provided on a surface of an exterior wall of an apparatus housing, wherein the cover reciprocates between an open position that exposes the support device and a closed position that covers the support device.

8. The image input apparatus of claim 7, wherein the detection device is a single electrical switch, and wherein the detections made by the single electrical switch are determined by three states of the electrical switch.

9. The image input apparatus of claim 7, wherein the cartridge has a developing process member, and wherein the detection device detects the transparent original document housed inside the cartridge is not developed based on the presence of the developing process member.

10. The image input apparatus of claim 7, wherein a detection edge is connected to the support device, and wherein the detection device detects the absence of the cartridge by detecting the detection edge that advances into a loading unit with the closing reciprocating movement of the cover.

11. An image input apparatus, comprising:

a support device that supports a cartridge having an original document support shaft, wherein the cartridge houses a transparent original document wound around the support shaft, wherein the support device further comprises a cartridge support shaft that engages with a first end of the support shaft and supports the support shaft and a guard unit that protects the cartridge support shaft during loading of the cartridge into the support device;

a feeding device that feeds the transparent original document scrolled from the cartridge;

an illumination device that illuminates the transparent original document with light;

a reading device that forms an image from the light that passed through the transparent original document and reads the image; and a cover provided on a surface of an exterior wall of an apparatus housing, wherein the cover reciprocates between an open position that exposes the support device and a closed position that covers the support device.

12. The image input apparatus of claim 11, wherein the guard unit has an opening through which the support shaft or the cartridge support shaft can be inserted or can be withdrawn.

13. The image input apparatus of claim 12, further comprising:

a guide member that guides the cartridge in a direction along the support shaft; and a pressing member positioned on an opposite side of the cartridge from the cartridge support shaft that presses the cartridge toward the cartridge support shaft, wherein the pressing member presses against the cartridge while the guide member guides the cartridge to engage the support shaft and the cartridge support shaft.

14. The image input apparatus of claim 12, the support device further comprising:

a second support member positioned on a side of the cartridge opposite the cartridge support shaft that supports a second end of the original document support shaft, wherein the guard unit moves in relative motion to the second support member;

a guide member that guides the cartridge support shaft in the direction of the original document support shaft; and a forcing device that forces the cartridge support shaft toward the second support member along the guide member.

15. The image input apparatus of claim 14, wherein the guard unit has a sloping section that slopes at an angle at less than 90° relative to the cartridge loading direction, wherein the sloping section is contacted by the cartridge during loading of the cartridge.

16. An image input apparatus, comprising:

a support device that supports a cartridge having an original document support shaft, wherein the cartridge houses a transparent original document wound around the support shaft;

a feeding device that feeds the transparent original document scrolled from the cartridge;

an illumination device that illuminates the transparent original document with light;

a reading device that forms an image from the light that passed through the transparent original document and reads the image; and a cover provided on a surface of an exterior wall of an apparatus housing, the cover reciprocates between an open position that exposes the support device and a closed position that covers the support device, wherein the support device further comprises an elastic member provided on the support device that temporarily anchors the cartridge while the cover is in the open position.

17. An image input apparatus, comprising:

a support device that supports a cartridge having an original document support shaft, wherein the cartridge houses a transparent original document wound around the support shaft, wherein the support device further comprises a loading unit for the cartridge, wherein a cut-out is formed in the loading unit to provide manual access for removal of the cartridge;

a feeding device that feeds the transparent original document scrolled from the cartridge;

an illumination device that illuminates the transparent original document with light;

a reading device that forms an image from the light that passed through the transparent original document and reads the image; and a cover provided on a surface of an exterior wall of an apparatus housing, the cover reciprocates between an open position that exposes the support device and a closed position that covers the support device.

18. An image input apparatus, comprising:

support means for supporting a cartridge having an original document support shaft, wherein the cartridge houses a transparent original document wound around the support shaft, including cartridge support shaft means;

feeding means for feeding the transparent original document scrolled from the cartridge;

illumination means for illuminating the transparent original document with light;

reading means for forming an image from the light that passed through the transparent original document and reading the image;

cover means provided on an inner surface of an exterior wall of an apparatus housing, the cover means reciprocating between an open position exposing the support means and a closed position covering the support means; and pressing means for pressing the cartridge against the cartridge support shaft means, and wherein the support shaft and the cartridge support shaft means engage in conjunction with the pressing of the cartridge by the pressing means in response to movement of the cover means.

19. The image input apparatus of claim 18, wherein the cover means does not protrude beyond the outer surface of the apparatus housing.

20. The image input apparatus of claim 18, wherein the feeding means comprises feeding shaft means for feeds the transparent original document by engaging the support shaft, wherein the feeding shaft means engages the support shaft when of the cover means moves from the open position to the closed position.

21. The image input apparatus of claim 18, wherein the support means further comprises:

cartridge support shaft means for engaging the support shaft and supporting the support shaft; and guard means for protecting the cartridge support shaft means during loading of the cartridge into the support means.

22. The image input apparatus of claim 21, wherein the guard means has an opening through which the support shaft or the cartridge support shaft means can be inserted or can be withdrawn.

23. The image input apparatus of claim 22, wherein the support means includes pressing means for pressing the cartridge against the cartridge support shaft means, and wherein the support shaft and the cartridge support shaft means engage in conjunction with the pressing of the cartridge by the pressing means.

24. The image input apparatus of claim 21, further comprising:

guide means for guiding the cartridge in a direction along the support shaft; and pressing means positioned on an opposite side of the cartridge from the cartridge support shaft means for pressing the cartridge toward the cartridge support shaft means, wherein the pressing means presses against the cartridge while the guide means guides the cartridge.

25. An image input apparatus, comprising:

support means for supporting a cartridge having an original document support shaft, wherein the cartridge houses a transparent original document wound around the support shaft, wherein the support means includes detection means for detecting whether the transparent original document is developed and detecting whether the cartridge housing the transparent original document is loaded in the support means;

feeding means for feeding the transparent original document scrolled from the cartridge;

illumination means for illuminating the transparent original document with light;

reading means for forming an image from the light that passed through the transparent original document and reading the image; and cover means provided on an inner surface of an exterior wall of an apparatus housing, the cover means reciprocating between an open position exposing the support means and a closed position covering the support means.

26. The image input apparatus of claim 25, wherein the detection means is one electrical switch means, and wherein the detections made by the electrical switch are determined by three states of the electrical switch means.

27. The image input apparatus of claim 25, wherein the cartridge has a developing process member, and wherein the detection means detects the transparent original document housed inside the cartridge is not developed based on the presence of the developing process member.

28. The image input apparatus of claim 25, wherein a detection edge is connected to the support means, and wherein the detection means detects the absence of the cartridge by detecting the detection edge that advances into a loading unit within the closed position of the cover means.

29. An image input apparatus, comprising:

support means for supporting a cartridge having an original document support shaft, wherein the cartridge houses a transparent original document wound around the support shaft;

feeding means for feeding the transparent original document scrolled from the cartridge;

illumination means for illuminating the transparent original document with light;

reading means for forming an image from the light that passed through the transparent original document and reading the image; and cover means provided on an inner surface of an exterior wall of an apparatus housing, the cover means reciprocating between an open position exposing the support means and a closed position covering the support means;

wherein the support means includes a loading unit comprising cartridge support shaft means and inner cartridge cover means for guiding the cartridge toward the cartridge support shaft means, wherein the inner cartridge cover means guides the cartridge in conjunction with the closing movement of the cover means, and wherein the cartridge support shaft means supports the cartridge when the cover means is in the closed position.

30. image input apparatus, composing:

a support that supports a cartridge housing a transparent original medium wound around an original medium support shaft;

a feeding mechanism that feeds the transparent original medium scrolled from the cartridge;

an illuminator that illuminates the transparent original medium with light during feeding by the feeding mechanism;

a reader that reads by composing an image from the transmitted light illuminating the transparent original medium; and a detector associated with the support that detects the status of the cartridge and detects the presence or absence of the cartridge.

31. An image input apparatus, comprising:

a support that supports a cartridge housing a transparent original medium wound around an original medium support shaft;

a feeding mechanism that feeds the transparent original medium scrolled from the cartridge;

an illuminator that illuminates the transparent original medium with light during feeding by the feeding mechanism;

a reader that reads by composing an image from the transmitted light illuminating the transparent original medium;

a support shaft that engages the original medium support shaft and supports the original medium support shaft; and a guard unit that protects the support shaft during loading of the cartridge into the support.

* * * * *